United States Patent [19]
Cannon

[11] Patent Number: 5,673,834
[45] Date of Patent: Oct. 7, 1997

[54] DOLLY LOCK APPARATUS

[76] Inventor: Ralph C. Cannon, P.O. Box 205, Wheatland, Okla. 73097

[21] Appl. No.: 693,680

[22] Filed: Aug. 13, 1996

[51] Int. Cl.$^6$ ............... B60R 9/048; B60R 9/06; B60R 11/06
[52] U.S. Cl. ............ 224/533; 224/488; 224/567; 414/462; 24/68 CD; 248/316.1; 296/37.6
[58] Field of Search ............... 224/488, 533, 224/535, 536, 537, 567, 569, 570, 917.5; 414/462; 24/68 CD, 543; 248/316.1, 316.5, 316.8; 296/37.5, 37.6

[56] References Cited

U.S. PATENT DOCUMENTS

| | | | |
|---|---|---|---|
| 2,706,569 | 4/1955 | Butler | 414/462 |
| 3,443,730 | 5/1969 | Meusel | 224/42.03 |
| 4,282,994 | 8/1981 | Hilliard | 224/533 |
| 4,403,716 | 9/1983 | Carlson et al. | 224/42.08 |
| 4,971,341 | 11/1990 | Magnuson | 280/1 |
| 5,004,133 | 4/1991 | Wyers | 224/917.5 |
| 5,094,373 | 3/1992 | Lovci | 224/536 |
| 5,209,628 | 5/1993 | Hassell | 414/462 |
| 5,228,607 | 7/1993 | Tolsdorf | 224/42.03 |
| 5,236,342 | 8/1993 | Pellettier | 224/42.03 R |
| 5,328,066 | 7/1994 | Cappuccio et al. | 224/42.03 R |
| 5,353,923 | 10/1994 | Skeels | 248/316.5 |
| 5,454,496 | 10/1995 | Sumida et al. | 224/509 |
| 5,522,530 | 6/1996 | Boettcher | 224/536 |

Primary Examiner—Renee S. Luebke
Assistant Examiner—Charles R. Eloshway
Attorney, Agent, or Firm—Dougherty, Hessin, Beavers & Gilbert

[57] ABSTRACT

An apparatus adapted to be mounted to a delivery vehicle for releasably locking a dolly thereto. The apparatus includes a frame and a pair of L-shaped lock arms pivotally connected to the frame. The lock arms are interconnected such that the lock arms counter-rotationally move together between an open position adapted for receiving and releasing the dolly and a closed position adapted for locking the dolly.

19 Claims, 2 Drawing Sheets

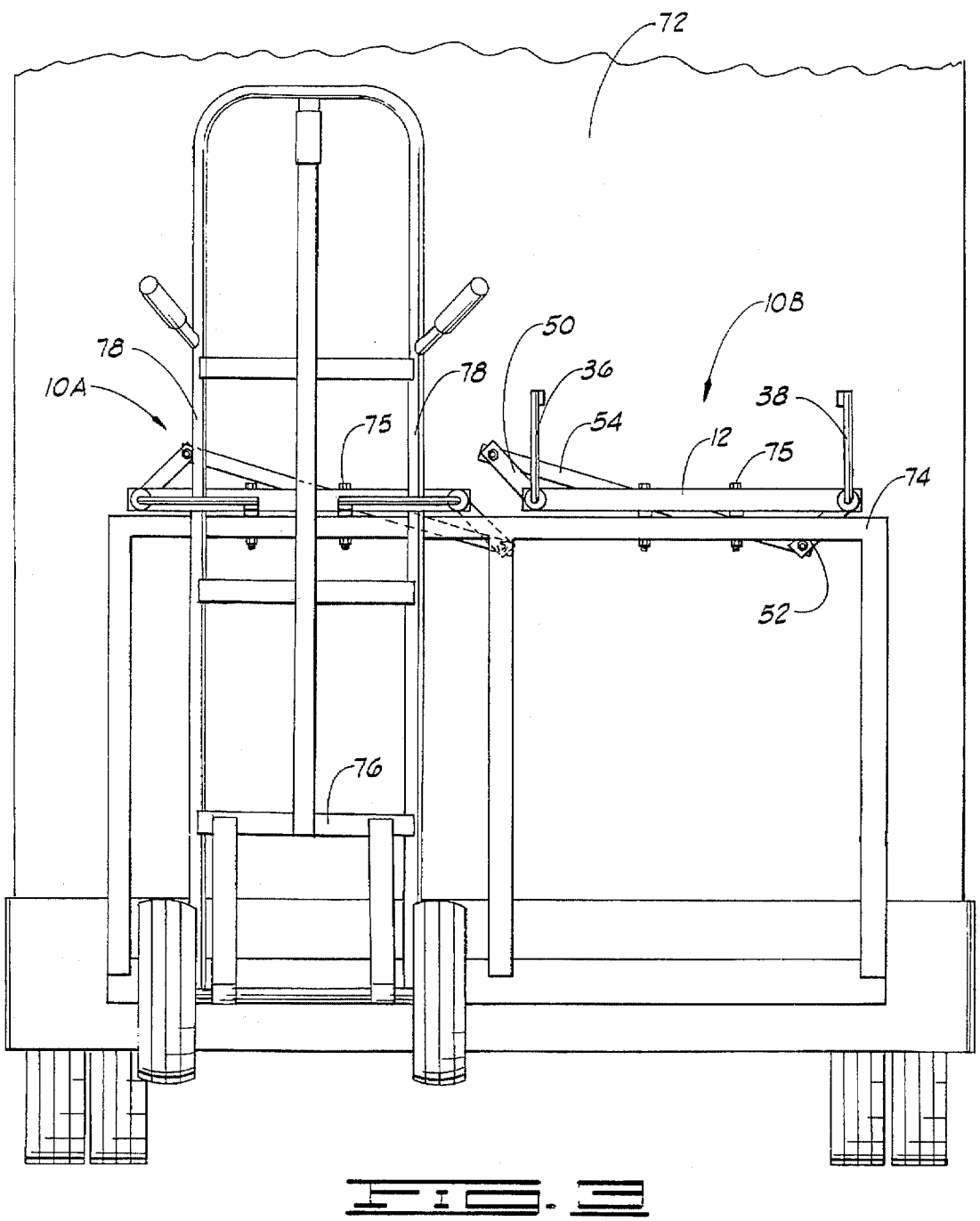

DOLLY LOCK APPARATUS

BACKGROUND OF THE INVENTION

This invention relates generally to locking apparatus and more particularly, but not by way of limitation, to improved dolly lock apparatus for releasably locking a dolly to a delivery vehicle.

Dollies are movable structures used to transport a load from one location to another. A dolly typically has wheels or rollers, a platform for supporting the load and a frame. Dollies are commonly used to deliver food and beverages from a truck to retail outlets, to move furniture and heavy appliances and other applications where it is desirable to move heavy, bulky or awkward loads a relatively short distance such as from a delivery vehicle to the desired location. Dollies are also known as "two-wheelers" and "hand trucks."

Dollies are commonly used in association with delivery vehicles. For ease of use, accessibility and spatial limitations, a dolly is often connected to the exterior of a delivery vehicle. However, certain problems are frequently encountered with storing a dolly on the outside of such a vehicle. First, dollies which become disconnected from a moving delivery vehicle pose a danger to other vehicles and their drivers. Second, dollies are subject to theft if not adequately secured to the vehicle.

Prior art dolly lock devices have recognized and attempted to overcome some of these problems. For example, U. S. Pat. No. 3,443,730 to Meusel and U. S. Pat. No. 5,236,342 to Pellettier, which are incorporated by reference herein, provide apparatus for attaching a dolly to a delivery vehicle. While these prior art devices perform adequately under some circumstances and for various applications, problems and shortcomings nonetheless exist. For example, while the device taught by Meusel appears to adequately secure a dolly, it is limited to a single size and shape of dolly and is inconvenient and inefficient for the operator to use. While the Pellettier device appears convenient to use, it inadequately secures the dolly.

Thus, there is the need for an improved dolly lock apparatus which adequately secures a dolly to the delivery vehicle to prevent inadvertent release and theft of the dolly, which is convenient and efficient for the operator to use and which will universally and releasably lock a variety of sized and shaped dollies.

SUMMARY OF THE INVENTION

The present invention provides improved dolly lock apparatus which meet the need described above and overcome the shortcomings of the prior art.

The dolly lock apparatus of the present invention is adapted to be mounted to a delivery vehicle for releasably locking a dolly thereto. It comprises a frame having a first end and a second end, a first L-shaped lock arm pivotally connected to the frame in a location toward the first end of the frame and a second L-shaped lock arm pivotally connected to the frame toward the second end of the frame. The present invention also includes means for interconnecting the lock arms such that the lock arms counter-rotationally move together between an open position adapted for receiving and releasing the dolly and a closed position adapted for locking the dolly.

The present invention also provides an apparatus for releasably locking a dolly to a delivery vehicle comprising a frame adapted to be attached to the delivery vehicle and two lock arms pivotal with respect to the frame. It also includes means for interconnecting the lock arms such that the lock arms can move together between an open position adapted for receiving and releasing the dolly and a closed position for retaining the dolly. The lock arms are dimensioned and oriented such that gravitational forces acting on the lock arms naturally bias the lock arms toward the closed position. The present invention also includes stop means for limiting the motion of the lock arms in the open position and in the closed position.

It is therefore a general object of the present invention to provide an improved dolly lock apparatus. Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is a front elevational view of the apparatus of the present invention shown mounted to a delivery vehicle.

DETAILED DESCRIPTION OF THE PREFERRED EMBODIMENTS

Figure 1:
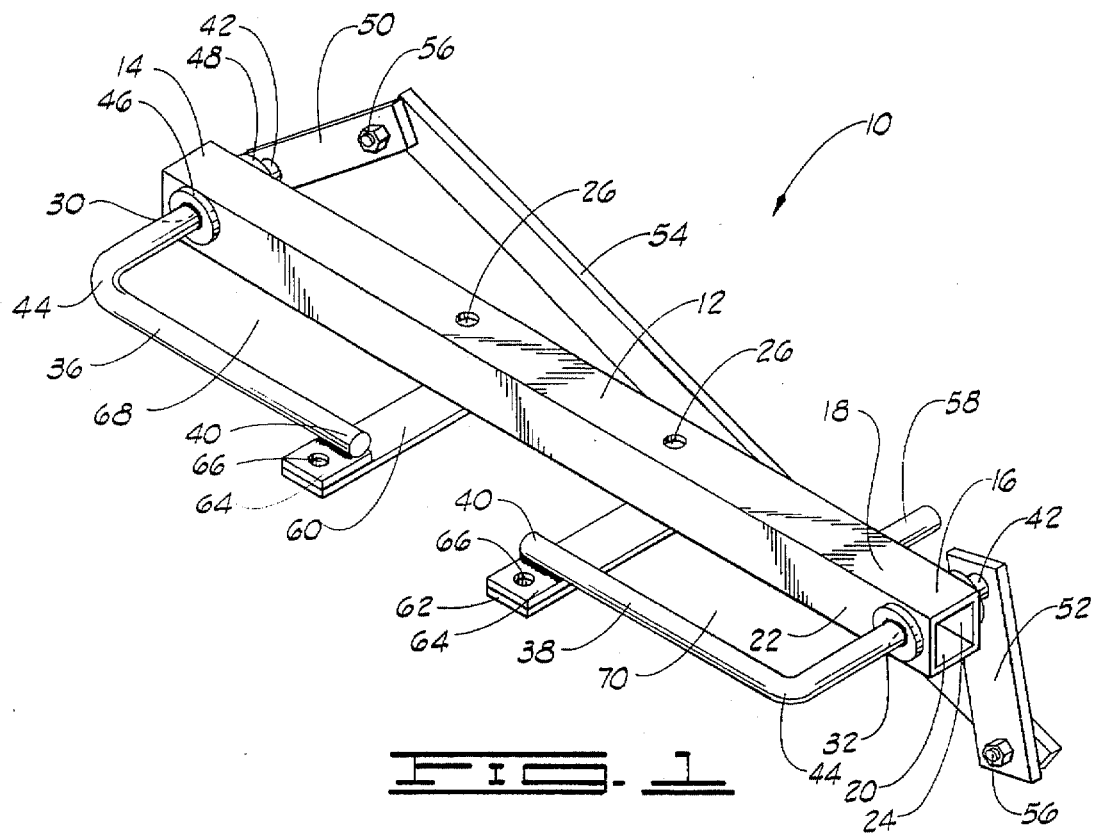
FIG. 1 is a perspective view of a dolly lock apparatus of the present invention.

Referring to the drawings, the presently preferred embodiments of the invention and their operation are illustrated. Like reference numerals refer to like parts throughout the drawings and this description.

Referring to FIG. 1, a presently preferred embodiment of the dolly lock apparatus of the present invention is illustrated and designated generally by the numeral 10. Apparatus 10 comprises frame 12 having opposite ends including first end 14 and second end 16. As illustrated in FIG. 1, frame 12 is tubularly shaped and has a rectangular cross section. Frame 12 has a top side 18, bottom side 20, front side 22 and back side 24 as illustrated in FIG. 1. Directional references herein are used solely for simplicity and do not limit apparatus 10 to any particular orientation.

Apparatus 10 is adapted to be mounted or attached to a delivery vehicle. Holes 26 are disposed through top side 18 and bottom side 20 of frame 12. Screws, bolts, etc., disposed through holes 26 provide a means for attaching frame 12 to a delivery vehicle, such as to a rail of a delivery truck. Apertures 26 can be positioned through various locations of frame 12, including through front side 22 and back side 24.

Apparatus 12 has a first lock arm 36 and a second lock arm 38. Each lock arm 36, 38 is L-shaped such that each has a lock portion 40, a shaft portion 42 substantially perpendicular to lock portion 40 and an elbow 44 disposed between lock portion 40 and shaft portion 42.

Lock arms 36, 38 are pivotally connected to frame 12. Shaft portion 42 of first lock arm 36 is disposed through a first aperture 30 in frame 12. First aperture 30 is disposed through front side 22 and back side 24 near first end 14 of frame 12. First aperture 30 is slightly larger than and is adapted to receive shaft portion 44 of first lock arm 36. Likewise, shaft portion 42 of second lock arm 36 is disposed through a second aperture 32 which is disposed through frame 12 near second end 16 of frame 12 such that second aperture 32 is adapted to receive shaft portion 42 of second lock arm 38.

Shaft portion 42 of each lock arm 36, 38 is disposed through first aperture 30 and second aperture 32, respectively, such that each shaft portion 42 extends through back side 24 of frame 12. A pair of washers such as front washer 46 and back washer 48, or other retaining means, are attached such as by weld to shaft portion 42 of each lock arm 36, 38 to retain lock arms 36, 38 in apertures 30, 32. Front washer 46 loosely abuts front side 22 and back washer 48 loosely abuts back side 24. Washers 46, 48 permit shaft portion 42 of lock arms 36, 38 to freely rotate but limit the movement of lock arms 36, 38 in a direction perpendicular to front side 22 and back side 24 of frame 12. Bearings (not shown) can be used to facilitate pivotal movement of lock arms 36, 38 with respect to frame 12.

Apparatus 10 also includes means for interconnecting lock arms 36, 38 such that when first lock arm 36 moves, second lock arm 38 also moves. As illustrated in FIG. 1, lock arms 36, 38 are interconnected such that lock arms 36, 38 counter-rotationally move together. Counter-rotational movement is achieved when shaft portions 42 of lock arm 36, 38 rotate in opposite directions and thus, when lock portions 40 of lock arms 36, 38 sweep in opposite circular arcs.

Means for interconnecting lock arms 36, 38 includes cam members 50, 52 extending from shaft portion 42 of lock arms 36, 38 and a connection member 54 attached to cam members 50, 52. More specifically, cam members 50, 52 have opposite ends. An end of first cam member 50 is rigidly attached such as by weld to an end of shaft portion 42 of first lock arm 36. An end of second cam member 52 is similarly attached to an end of shaft portion 42 of second lock arm 38. Accordingly, cam members 50, 52 rotate together with lock arms 36, 38. Lock end portions 40 of lock arms 36, 38 rotate in a plane parallel to the plane of rotation of cam members 50, 52. A connection member 54 pivotally connects at its opposite ends to cam members 50, 52. Pivot means such as a pin or bolt 56 allows pivotal movement between cam members 50, 52 and connection member 54.

Other means for interconnecting lock arms 36, 38 are available. For example, a wire or rope (not shown) can be attached to shaft portions 42 of lock arms 36, 38 such that a rotational force exerted on first lock arm 36 wraps wire or rope around shaft portion 42 of first lock arm 36 causing a rotational force to be conveyed to shaft portion 42 of second lock arm 38.

As described herein and illustrated in FIG. 1, cam members 50, 52 are attached to the ends of shaft portions 42 of lock arms 36, 38 which are disposed through apertures 30, 32 in frame 12. Accordingly, cam members 50, 52 as well as connection member 54 are located distal to back side 24 of frame 12, i.e., behind frame 12. However, in some circumstances it may be desirable to mount apparatus 10 in a location in which there is not clearance for moving parts distal to or behind frame 12, i.e., a zero clearance application, such as to a bumper or to a panel of a delivery vehicle. Apparatus 10 can accommodate a zero clearance application simply by attaching cam members 50, 52 to shaft portions 42 of lock arms 36, 38 proximal to or in front of frame 12 rather than distal to or behind frame 12.

As indicated above, lock arms 36, 38 move counter-rotationally in the embodiment shown in FIG. 1. Counter-rotational movement of lock arms 36, 38 is achieved by cam members 50, 52 extending in generally opposite directions from shaft portions 42 of lock arms 36, 38 such that connection member 54 is generally diagonal with respect to the longitudinal axis of frame 12. In other words, first cam member 50 extends in a direction generally above top side 18 of frame 12 and second cam member 52 extends generally in a direction generally below bottom side 20 of frame 12. In this arrangement, connection member 54 is in a state of tension when lock arms 36, 38 are moved from the closed position to the open position by exerting an upward force on lock portion 40 of first lock arm 36, and is in a state of compression when lock arms 36, 38 are moved from the closed position to the open position by exerting an upward force on lock portion 40 of second lock arm 38.

In an alternate embodiment, lock arms rotate in the same direction. Such movement can be achieved by cam members 50, 52 extending in generally the same direction from shaft portions 42 of lock arms 36, 38 such that connection member 54 is generally parallel to the longitudinal axis of frame 12.

Apparatus 10 also includes stop means for stopping the movement of lock arms 36, 38 in an open position and in a closed position. Stop means includes a peg member 58 attached to back side 24 of frame 12 and positioned to interfere with the rotation of and abut second cam member 52 when lock arms 36, 38 are in an open position. Thus, peg member 58 limits the movement of lock arms 36, 38 and defines the open position. It is recognized that peg member 58 can also effectively stop the movement of lock arms 36, 38 in the open position when peg member 58 is relocated to interfere with and abut any moving part of apparatus 10 including first cam member 50, connection member 54 and lock arms 36, 38.

Stop means for stopping movement of lock arms 36, 38 in the closed position includes lock arm stop 60, 62 attached to and extending from bottom side 20 of frame 12. In the closed position, first lock arm stop 60 interferes with and abuts lock portion 40 of first lock arm 36 and second lock arm stop 62 interferes with and abuts lock portion 40 of second lock arm 38. In a zero clearance application wherein cam members 50, 52 and connection member 54 are positioned proximal to frame 12, one or both of lock arm stops 60, 62 may have a channel (not shown) to accommodate the diagonally oriented connection member 54 (since a straight lock arm stop 60, 62 may interfere with the motion of connection member 54).

Lock means for securing lock arms 36, 38 to lock arm stops 60, 62 are also provided. Lock means includes a tab 64 attached to lock portions 40 of lock arms 36, 38. Tab 64 abuts lock arm stops 60, 62 when lock arms 36, 38 are in the closed position. Holes 66 disposed through tabs 64 and through lock arm stops 60, 62 provide a location for a locking pin or padlock (not shown) to secure lock arms 36, 38 in the closed position to prevent theft and the inadvertent release of a dolly from apparatus 10.

Figure 2:
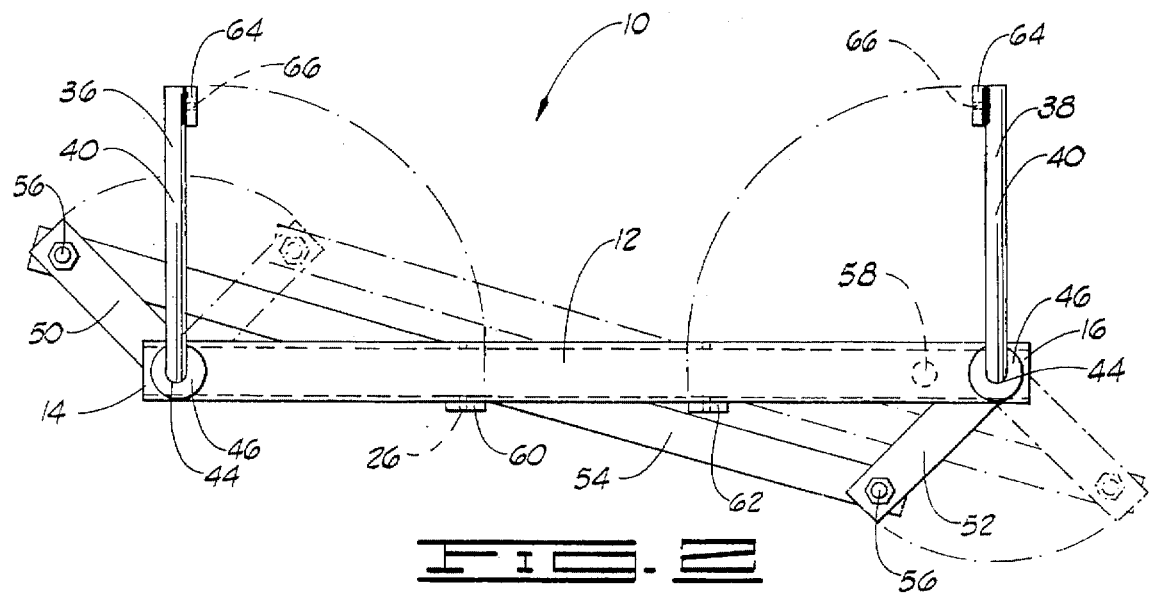
FIG. 2 is a front elevational view of the dolly lock apparatus of the present invention.

Referring to FIG. 2, the open and closed positions of lock arms 36, 38 are illustrated. In the open position, lock portions 40 of lock arms 36, 38 are approximately parallel and in an upright position. Peg member 58 defines the open position by limiting the movement of lock arms 36, 38. In the open position, the frame of a dolly can be received.

Lock arms 36, 38 are in the closed position (illustrated by dashed lines in FIG. 2) when lock arms 36, 38 are rotated approximately 90° from the open position. In the closed position, lock portions 40 of lock arms 36, 38 are substantially aligned and substantially parallel to an axis of frame 12. Lock arm stops 60, 62 define the closed position by interfering with the movement of and abutting lock portions 40 of lock arms 36, 38.

Referring to FIGS. 1 and 2, voids 68 and 70 are defined when lock arms 36, 38 are in the closed position. First void 68 is defined and bordered by first lock arm 36 (including lock portion 40, elbow 44 and shaft portion 42), a portion of front side 22 of frame 12 and first lock arm stop 60. Likewise, second void 70 is defined and bordered by second lock arm 38 (including lock portion 40, elbow 44 and shaft portion 42), a portion of front side 22 of frame 12 and second lock arm stop 62. Voids 68, 70 are adapted for universally receiving and locking the frame of many different sized and shaped dollies.

Apparatus 10 also includes means for biasing lock arms 36, 38 toward the closed position. Means for biasing aids in securing a dolly to apparatus 10 by maintaining lock arms 36, 38 in a closed position until a force sufficient to overcome the biasing force is exerted. Biasing means also eliminates the requirement that an operator manually move lock arms 36, 38 to the closed position.

Means for biasing can include a spring (not shown) attached, for example, between cam member 50, 52 or connection member 54 and frame 12 such that the spring biases lock arms 36, 38 toward the closed position. Preferably, however, lock arms 36, 38 are dimensioned and oriented to react to gravitational forces to naturally bias lock arms 36, 38 toward the closed position. The weight and orientation of lock arms 36, 38, together with the attached cam members 50, 52 and connection member 64, naturally result in lock arms 36, 38 being biased toward the closed position. As illustrated in FIG. 1, apparatus 10 can be considered to be gravitationally biased or dimensionally biased. Lock arms 36, 38 are considered to be biased toward the closed position notwithstanding the existence of a dead spot, i.e., equilibrium, in the fully open position. Such a dead spot can be created by orienting peg member 58 such that lock arms 36, 38 rotate to an open position which is slightly greater than 90° from the closed position.

Referring to FIG. 3, two apparatus 10 of the present invention are shown mounted to the rear of a delivery vehicle 72. Apparatus 10A is shown in the closed position having a dolly 76 locked thereto and apparatus 10B is shown in the open position without a dolly. Frame 12 of each apparatus 10 is mounted to a rail 74 of delivery vehicle 72 by way of bolts 75 disposed through holes 26 in frame 12.

In operation, interconnected lock arms 36, 38 of apparatus 10 can be moved between an open position which is adapted to receive and release dolly 76 as is illustrated by apparatus 10B and a closed position which locks dolly 76 as is illustrated by apparatus 10A. To release dolly 76 from apparatus 10A, any locking mechanism such as a padlock disposed through holes 66 must be removed. Lock arms 36, 38 can then be moved to the open position defined by peg member 58 by exerting a force upward on lock portion 40 of either first arm 36 or second arm 38. Since lock arms 36, 38 are interconnected, an upward force on either lock arm 36, 38 will move both lock arms 36, 38 to the open position.

When apparatus 10A is in the open position (as illustrated by apparatus 10B in FIG. 3), dolly 76 is released and can then be removed and used. To re-lock dolly 76 to delivery vehicle 72, dolly 76 is appropriately positioned adjacent apparatus 10 when lock arms 36, 38 are in the open position. More specifically, vertical supports 78 of dolly 76 are disposed through voids 68, 70. Due to the size and orientation of voids 68, 70, apparatus 10 can thus releasably lock various sized dollies. Lock arms 36, 38 are biased toward the closed position and thus trap the dolly. If desired, a locking pin or padlock (not shown) can be disposed through hole 66 for further securing dolly 76 to prevent theft and inadvertent release of dolly 76.

Thus, the present invention is well adapted to carry out the objects and attain the ends and advantages mentioned as well as those inherent therein. While preferred embodiments of the present invention have been illustrated for the purpose of the present disclosure, changes in the arrangement and construction of parts and the performance of steps can be made by those skilled in the art, which changes are encompassed within the scope and spirit of the present invention as defined by the appended claims.

What is claimed is:

1. An apparatus adapted to be mounted to a delivery vehicle for releasably locking a dolly thereto comprising:
   a frame having a first end and a second end;
   a first L-shaped lock arm pivotally connected to said frame in a location toward said first end of said frame;
   a second L-shaped lock arm pivotally connected to said frame toward said second end of said frame and;
   means for interconnecting said lock arms such that said lock arms counter-rotationally move together between an open position adapted for receiving and releasing the dolly and a closed position adapted for locking the dolly, said lock arms gravitationally biased toward the closed position.

2. The apparatus of claim 1 further comprising stop means for defining the open and closed positions by stopping the movement of said stop arms in the open and closed positions.

3. The apparatus of claim 2 wherein said stop means comprises a lock arm stop attached to and extending from said frame, said lock arm stop for abutting a lock portion of said first lock arm.

4. The apparatus of claim 1 wherein said means for interconnecting comprises a cam member extending from a shaft portion of each of said lock arms, said cam members pivotally connected to opposite ends of a connection member.

5. The apparatus of claim 1 wherein a shaft portion of each said lock arm is disposed through an aperture in said frame.

6. The apparatus of claim 1 wherein said lock arms are adapted for universally receiving the dolly, the dolly being one of a plurality of various sized and shaped dollies.

7. An apparatus for releasably locking one of a plurality of various sized dollies comprising:
   a frame having a first aperture and second aperture disposed therethrough;
   a first L-shaped lock arm having a first shaft portion and a first lock portion, said first shaft portion pivotally connected to said frame through said first aperture;
   a second L-shaped lock arm having a second shaft portion and a second lock portion, said second shaft portion pivotally connected to said frame through said second aperture; and
   means for interconnecting said lock arms such that said lock arms rotate together between an open position adapted for receiving and releasing the dolly and a closed position adapted for locking the dolly, said lock arms dimensioned and oriented such that gravitational forces acting upon said lock arms bias said lock arms toward the closed position.

8. The apparatus of claim 7 wherein said lock arms counter-rotationally move together.

9. The apparatus of claim 7 further comprising stop means for limiting movement of said lock arms in both the open position and the closed position.

10. The apparatus of claim 7 wherein said means for interconnecting comprises a cam member attached to the shaft portion of each of said lock arms, said cam members connected to opposite ends of a connection member.

11. An apparatus for releasably locking a dolly to a delivery vehicle comprising:

a frame adapted to be attached to the delivery vehicle;

two lock arms pivotal with respect to said frame;

means for interconnecting said lock arms such that said lock arms can counter-rotationally move together between an open position adapted for receiving and releasing the dolly and a closed position for retaining the dolly, said lock arms dimensioned and oriented such that gravitational forces acting on said lock arms naturally bias said lock arms toward the closed position; and stop means for limiting the motion of said lock arms in the open position and in the closed position.

12. The apparatus of claim 11 wherein said means for interconnecting comprises a cam member attached to a shaft portion of each of said lock arms, said cam members pivotally connected to opposite ends of a connection member.

13. The apparatus of claim 12 wherein said shaft portion of each said lock arm is disposed through an aperture in said frame.

14. The apparatus of claim 11 wherein said lock arms are adapted for universally receiving the dolly, the dolly being one of a plurality of various sized and shaped dollies.

15. An apparatus adapted to be mounted to a delivery vehicle for releasably locking one of a plurality of various sized and shaped dollies thereto comprising:

a frame having a first end and a second end;

a pair of L-shaped lock arms each having a shaft portion, a lock portion and an elbow disposed between said shaft portion and said lock portion, said shaft portion of each said lock arm pivotally connected to said frame;

a lock arm stop attached to and extending from said frame, said lock arm stop for abutting one said arms; and means for interconnecting said lock arms such that said lock arms rotate together between an open position for receiving and releasing the dolly in which said lock portions of said lock arms are upright and approximately parallel and a closed position for retaining the dolly in which said lock portions of said lock arms are approximately parallel with said frame.

16. The apparatus of claim 15 wherein said means for interconnecting comprises a cam member attached to said shaft portion of each of said lock arms, said cam members connected to opposite ends of a connection member.

17. The apparatus of claim 16 wherein said arms move in counter-rotational directions.

18. The apparatus of claim 17 wherein said shaft portion of each said lock arm is disposed through an aperture in said frame.

19. The apparatus of claim 18 wherein said lock arms are dimensioned and oriented such that gravitational forces bias said lock arms toward the closed position.

\* \* \* \* \*